UNITED STATES PATENT OFFICE.

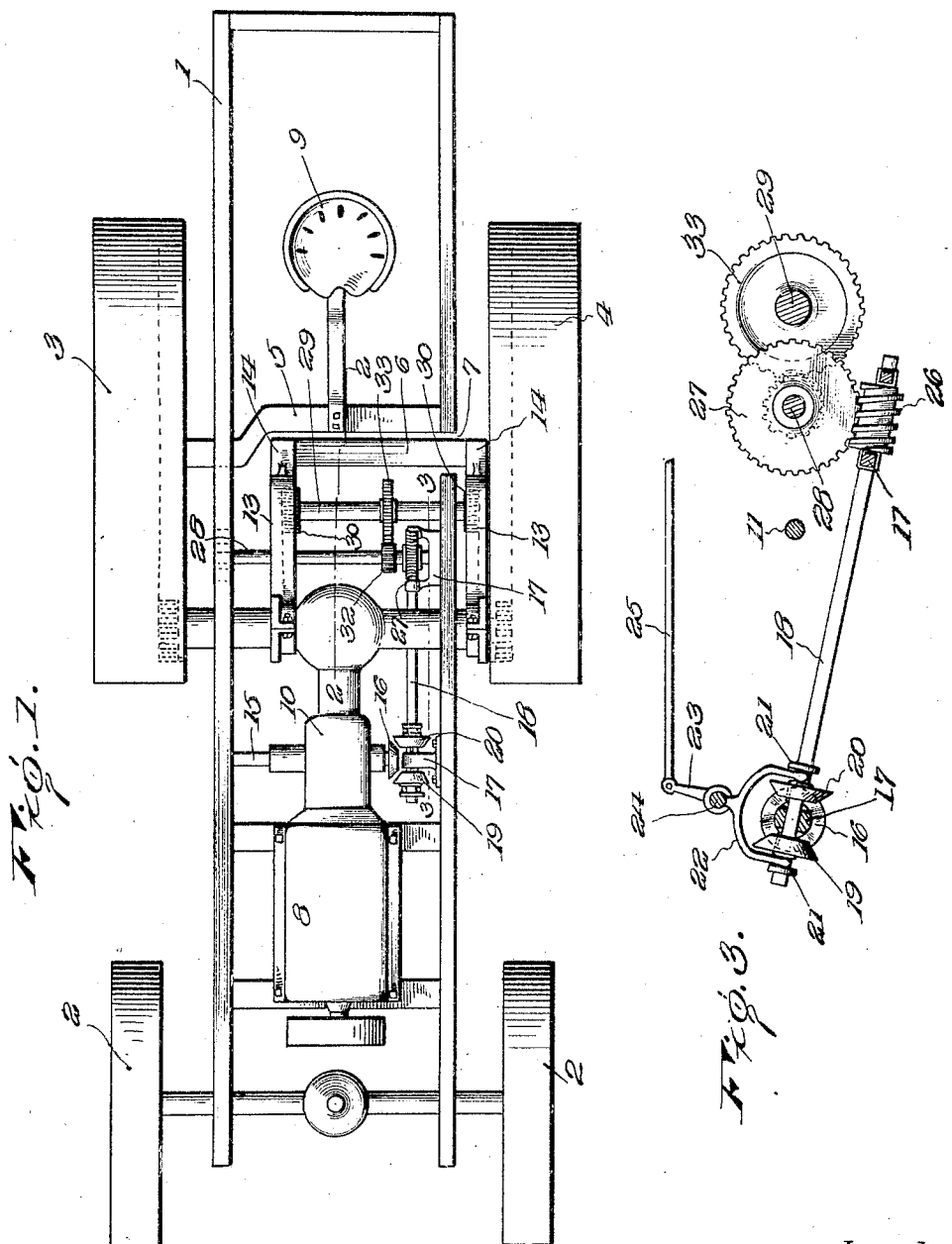

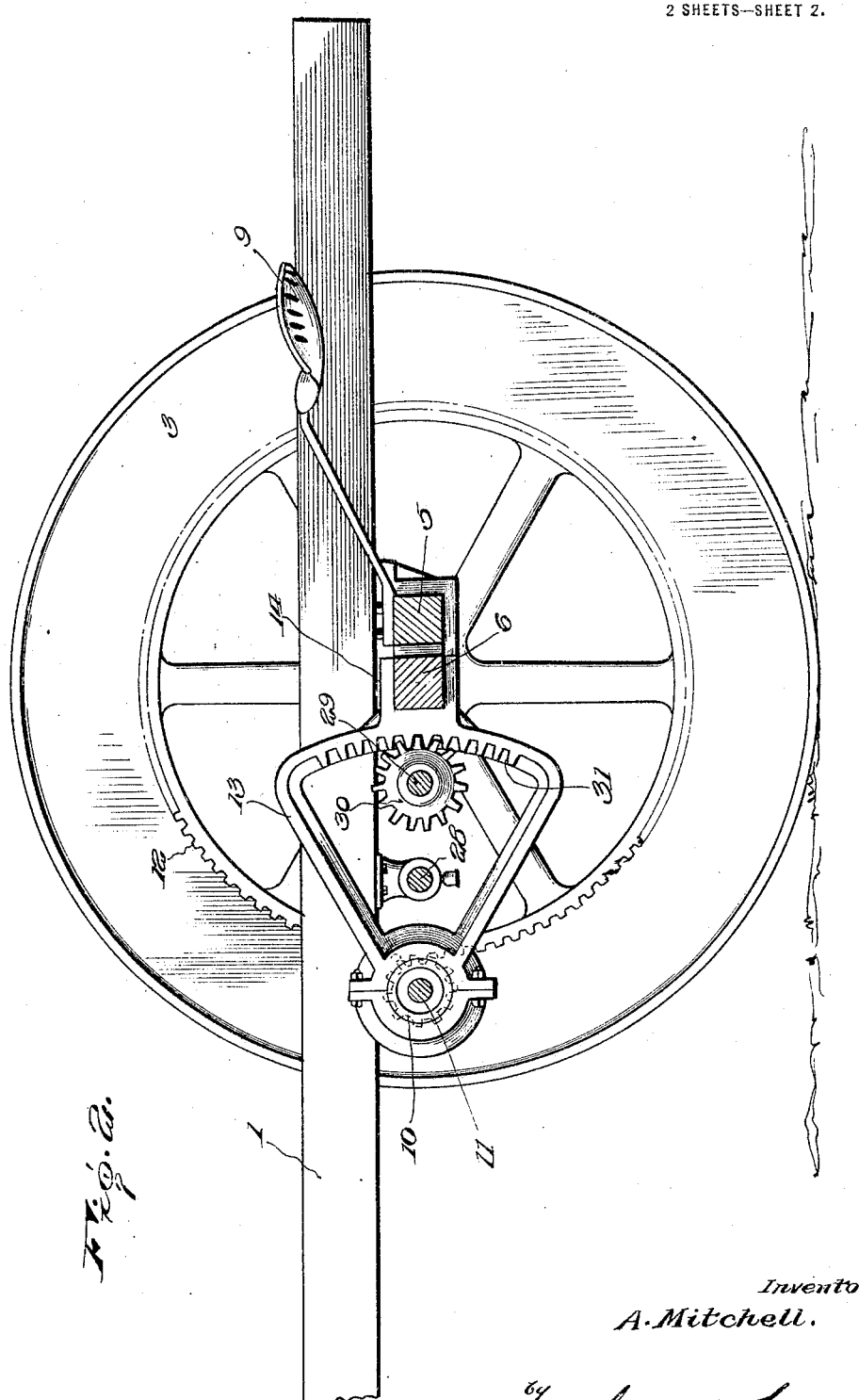

ALEXANDER MITCHELL, OF PUEBLO, COLORADO, ASSIGNOR TO THE ALEX MITCHELL MOTOR PLOW COMPANY, A CORPORATION OF COLORADO.

ADJUSTING MECHANISM FOR MOTOR-PLOWS.

1,368,643.

Specification of Letters Patent.  Patented Feb. 15, 1921.

Application filed December 6, 1919. Serial No. 342,897.

*To all whom it may concern:*

Be it known that I, ALEXANDER MITCHELL, a citizen of the United States, residing at Pueblo, in the county of Pueblo and State of Colorado, have invented certain new and useful Improvements in Adjusting Mechanism for Motor-Plows, of which the following is a specification.

This invention relates to motor plows and has particular reference to means for maintaining the level condition of the main frame whether the plow be moving over an unplowed field or be at work plowing the same. The invention seeks to provide simple and efficient means under the control of the operator whereby the power of the engine may be utilized to adjust one wheel in a vertical plane so as to permit the furrow wheel to run upon the surface of an unplowed field or in the bottom of a furrow. The invention is illustrated in the accompanying drawings and consists in certain novel features which will be particularly pointed out in the claims following a detailed description.

In the drawings—

Figure 1 is a plan view of so much of a motor plow as is necessary to an understanding of the present invention;

Fig. 2 is an enlarged section substantially on the line 2—2 of Fig. 1;

Fig. 3 is a detail section on the line 3—3 of Fig. 1, parts of the supporting structure being omitted.

The motor plow comprises a frame 1 supported at its front end upon steering wheels 2 and near its rear end upon ground wheels 3 and 4, the wheel 3 being carried by a fixed axle 5 and the wheel 4 being carried by a movably supported axle 6 which extends through a division or opening 7 in the adjacent side of the main frame. A motor 8, preferably of the internal combustion type, is supported upon the front portion of the main frame and acts through a train of gearing to impart rotation to the wheels 3 and 4 and thereby effect travel of the plow. A seat 9 for the operator may be supported upon the fixed axle 5 or some other part of the main frame and the plows (not shown) are coupled to the rear portion of the main frame, as will be readily understood. From the rear end of the motor casing, a gear casing 10 extends longitudinally of the main frame and within the said casing is housed the driving mechanism whereby motion is transmitted from the engine to a driving shaft 11 disposed transversely upon the frame and equipped at its ends with pinions meshing with gears 12 secured to the respective wheels 3 and 4. Pivotally fitted upon that portion of the gear casing which incloses the driving shaft 11 are open segmental frames 13 which are provided at their rear ends with rearwardly projecting lugs 14 in which the movable axle member 6 is secured. In advance of the driving shaft 11, a shaft 15 is mounted transversely in the casing 10 and has one end equipped with a beveled friction pinion 16, as shown. Upon a side bar of the main frame 1, I secure a bearing bracket 17 in which a longitudinally disposed shaft 18 is journaled and upon the forward portion of said shaft I mount opposed beveled friction pinions 19 and 20 which are keyed to the said shaft so that they may slide longitudinally thereof but are constrained to rotate therewith. These pinions 19 and 20 are equipped with hubs or collars 21 having annular grooves which are engaged by the arms of a fork or yoke 22 which is pivotally mounted above the pinions and supported from the main frame. An arm 23 rises from the pivot 24 of the said yoke and to the upper end of said arm a link 25 is secured, said link extending rearwardly and mounted in any convenient manner at its rear end whereby it may be manipulated by an operator upon the seat 9. Upon the rear end of the shaft 18, I secure a worm 26 which meshes with a worm gear 27 secured upon a shaft 28 which is mounted in suitable bearings upon the main frame in rear of the driving shaft 11 and in advance of a countershaft 29 which may be supported in any convenient manner from the main frame and is equipped with pinions 30 meshing with gears or racks 31 formed on the forward side of the rear arcuate ends of the segmental frames 13. A pinion 32 is secured upon the shaft 28 and meshes with a gear 33 on the shaft 29 so that the motion of the shaft 28 will be transmitted to the countershaft 29 and thence to the segments 13 so as to raise or lower the axle 6 and effect adjustment of the wheel 4.

The operation of the device is thought to be evident from the foregoing description, taken in connection with the accompanying drawings, but it may be briefly summarized. Normally the yoke or fork 22 will be so set that both pinions 19 and 20 will be out of engagement with the pinion 16 and, consequently, the axle 6 will remain in the position in which it has been set and the wheel 4 will not vary its position relative to the main frame. Should it be necessary, however, for the wheel 4 to be raised or lowered so that the frame will remain level while either the wheel 3 or the wheel 4 runs in a furrow, the operator by manipulating the link 25 will shift the yoke 22 so as to bring the pinion 19 or the pinion 20, as the case may be, into engagement with the pinion 16 and thereby cause rotation of the shaft 18. The shaft 18, of course, will directly rotate the worm 26 which will act upon the worm gear 27 and transmit motion through the same and the elements 28, 32, 33 and 29 to the pinions 30 and thence to the racks 31 so that the segments 13 will be caused to swing about the shaft 11 as a pivotal center and effect the desired vertical adjustment of the frame by shifting the axle 6 and the wheel 4 carried by the same. It will be noted that my device is exceedingly simple and that the parts are compactly arranged. It may be readily adjusted without effort on the part of the operator and when once set will remain in the set position inasmuch as the worm gear acts as a brake to prevent accidental movement. The operator is relieved of all the manual strain of lifting or lowering the frame inasmuch as that work is performed by power from the motor and there is no appreciable increase in the dead weight of the machine.

Having thus described the invention, what is claimed as new is:

1. In a motor plow, the combination with a main frame having an opening in one side, of a fixed axle member secured in the main frame, a ground wheel carried by said axle member at the side of the main frame remote from the side having an opening, a second axle member extending through the opening in the main frame and free of the frame, a ground wheel carried by the outer end of said axle member, supports for said axle member pivotally mounted with respect to the frame, and motor-driven means acting directly on said supports for swinging them about their pivotal mounts whereby to raise or lower the last-named axle member and the wheel carried thereby.

2. In a motor plow, the combination of a main frame, a motor carried thereby, an axle member extending laterally through the main frame and free of the same, pivotally mounted supports for said axle member, a ground wheel carried by the outer end of said member, gearing acting directly on said pivotally mounted supports to effect movement of the same in vertical planes about their pivotal mounts, motor-driven means for rotating the ground wheel, an intermediate shaft operatively connected with the gearing acting on said pivotally mounted supports, a shaft driven directly by the motor, and manually shiftable means for operatively connecting said intermediate shaft with the motor-driven shaft and controlling the direction of rotation of the intermediate shaft.

3. In a motor plow, the combination with a main frame, and a motor mounted thereon, of segmental gears pivotally supported by the frame, an axle secured to and extending laterally from the said segmental gears, a ground wheel carried by the outer end of said axle, a countershaft carried by the main frame in advance of said axle, pinions on said shaft meshing with the segmental gears, an intermediate shaft geared to said countershaft, a worm gear on said intermediate shaft, a longitudinally disposed shaft mounted upon the frame, a worm on said longitudinal shaft meshing with said worm gear, a transmission shaft driven from the motor, a friction pinion on said shaft, a pair of opposed friction pinions slidably mounted on the longitudinal shaft and constrained to rotate therewith, and means for shifting said opposed pinions whereby to bring one or the other into engagement with the first-mentioned pinion.

In testimony whereof I affix my signature.

ALEXANDER MITCHELL. [L. S.]